B. F. HEDDEN.

Steam-Engine Piston.

No. 2,488.

Reissued Feb. 19, 1867.

Witnesses;

Chas. H. Leonard

Fred. W. Ameth

Inventor;

B. F. Hedden by his Attorney

E. S. Renwick

United States Patent Office.

ORLANDO KELSEY AND JOSHUA F. BAILEY, OF NEW YORK, N. Y., ASSIGNEES OF BENJAMIN F. HEDDEN.

*Letters Patent No.* 39,397, *dated August* 4, 1863; *reissue No.* 2,488, *dated February* 19, 1867

IMPROVEMENT IN PISTONS FOR STEAM ENGINES.

The Schedule referred to in these Letters Patent and making part of the same.

TO ALL WHOM IT MAY CONCERN:

Be it known that I, BENJAMIN F. HEDDEN, of Norwich, in the county of New London, and State of Connecticut, have invented a new and useful Improvement in Steam Pistons; and I do hereby declare that the following is a full, clear, and exact description thereof, reference being had to the accompanying drawings, making a part of this specification, in which—

Similar letters of reference indicate corresponding parts in the several figures.

Figure 1:
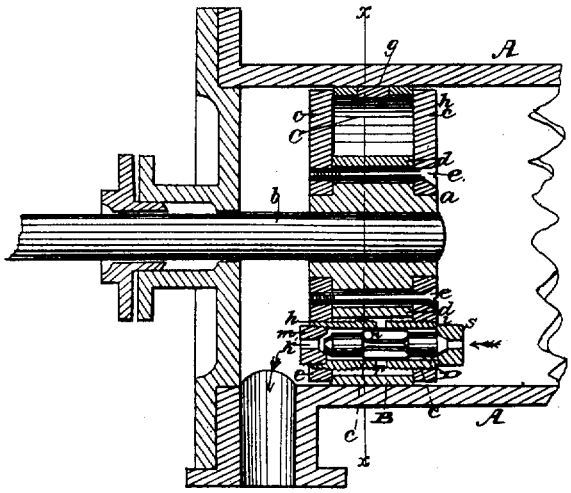
Figure 1 represents a section of a steam cylinder with certain parts of my invention applied to it.
Figure 2:
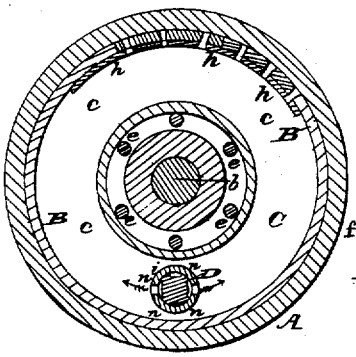
Figure 2 is a transverse section through fig. 1, taken in the plane indicated by red line *x x*.

This invention relates to that class of steam pistons in which the steam that is let into the cylinders is admitted within the piston and made to expand the packing ring, thus causing the piston to work steam-tight, and to continue in this condition for a considerable time. It frequently happens that the valve and valve-seat, which are used in the class of pistons to which my invention belongs, require to be adjusted, repaired, and renewed from time to time, and it is therefore desirable that these parts be so constructed and applied to the piston that they can be removed without removing the piston from the cylinder, or taking the piston apart. It also frequently happens that the ring-packing of the piston requires examination, and it is therefore desirable that the valvular apparatus and the ring-packing should be so combined with the piston that the latter can be readily applied to and withdrawn from the piston without requiring both heads of the cylinder to be opened for the purpose. To these ends my invention consists of the combination of the piston or piston-hub, and the expansible packing ring, with a tubular case containing the steam valves that admit the steam into the interior of the packing ring from the opposite sides of the steam piston, and also the seats of said valves, so that the said case, with the valves and seats, constitutes an independent apparatus or valve-tube, which can be readily removed from the piston for the purpose of adjusting the valves or valve-seats, and can then be readily reapplied to the piston without affecting the adjustment of the valves or their seats; and these operations may be effected without removing the piston from the cylinder or taking it apart. My invention consists further of the combination of the expansible packing ring of a piston with a cylindrical shell of suitable size to be applied to the piston in the space between its heads in such manner that the combined surfaces of the said shell and the expansible ring or rings fill up the space between the heads of the piston. Consequently, the piston may be centred in the cylinder by the shell, which in horizontal cylinders will sustain the weight of the piston, while the expansible ring may be left free to adapt itself to the cylinder; and, moreover, the entire ring-packing (consisting of the expansible ring and shell) may be readily applied to the piston or removed from it, when but one of its heads and the corresponding head of the steam cylinder are removed. My invention consists further of the combination of the expansible packing ring and cylindrical shell aforesaid with the piston, and with a valvular apparatus for admitting steam from alternately opposite sides of the piston to act upon the expansible packing.

To enable others skilled in the art to make and use my invention, I will proceed to describe the construction and operation of the two pistons represented in the drawings.

Figure 3:
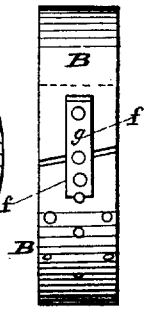
Figure 3 is a side view of the metallic packing ring detached from the piston.
Figure 4:
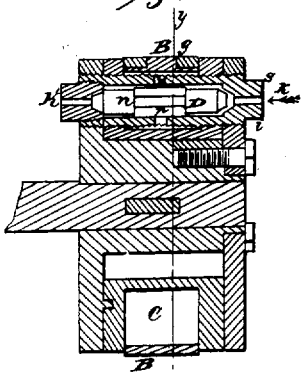
Figure 4 is a diametrical section through a steam piston having one of its flanges and its hub cast or otherwise secured to the piston-rod, with my invention applied to it.
Figure 5:
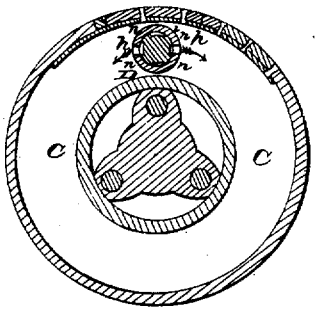
Figure 5 is a transverse section through fig. 4, taken at the point indicated by red line *y y* thereon.
Figure 6:
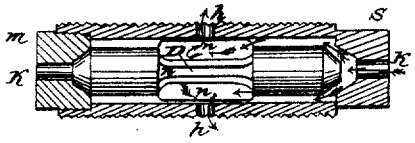
Figure 6 is an enlarged view of the valve-tube, showing, by a longitudinal section through the same, the puppet-valve and the screw-cap for removing it.

In the drawings, A represents a portion of a common steam cylinder, enclosed within which is a piston, consisting of a solid hub, *a*, which is suitably secured on the end of the piston-rod *b*. The hub *a* is constructed with annular recesses in its ends, which receive the piston-heads *c c'*, the diameter of which is slightly less than that of the interior of the cylinder A, as shown in fig. 1. Between these two piston-heads *c c'* is a cylinder, *d*, which is considerably smaller than the diameter of the heads *c c'*, and this cylinder forms, when in place, two annular chambers, and admits of the screw-bolts *e e* being passed through the heads *c c'* for confining these heads on the hub *a* without allowing steam to escape through the holes made for these bolts. The inside surfaces of the heads *c c'* are ground to fit the sides of the cylinder *d* and the metallic packing ring B, so that the chamber C, which is between the packing ring B and cylinder *d* will thus be made steam-tight. The packing ring, which constitutes the circumference of the cylindrical piston, is made of a strip of metal of even thickness, bent in the form of a hoop, with the abutting ends cut off obliquely and parallel to each other, as shown in fig. 3. Two slots, *f f*, are cut in the ends of this ring B to receive an oblong plate *g*, which is riveted to a plate, *h*, that is itself riveted to one of the ends of the hoop inside, so that both the plates *g* and *h* break joints with the ends of the ring B, as shown in figs. 1, 2, 3, 4, and 5. This mode of constructing the packing ring allows it to expand when steam is let into the chamber C, and at the same time prevents the escape of steam through the opening at the junction of the ends of this ring. In putting these parts together one of the piston-heads, *c*, is put on the reduced end of the hub *a*, then the cylinder *d* is put over the hub *a*, then the ring B; the other piston-head *c'* can now be put in its place, and the whole bolted together as represented in the sectional view, fig. 1. A hole is drilled through the two piston-heads *c c'*, in a line parallel with the piston-rod *b*, and this hole is then tapped to receive a hollow screw-rod, *i*, which is equal in length to the thickness of the piston. This hollow screw-rod is drilled out longitudinally, and a valve-seat is formed in one of its ends, with a small opening or port, *k*, through the centre of this end. The opposite end of this screw-rod *i* is tapped inside to receive the male screw-thread of a screw-cap, *m*, in which is formed a valve-seat, which corresponds with the seat at the opposite end of the screw-rod, as shown clearly in fig. 6. This cap or nut *m* also has a small port, *k'*, through its centre. Within this hollow screw-rod I place a puppet-valve, D, which has two valve ends corresponding to the valve-seats in the ends of the hollow screw-rod *i*, and these valve ends are kept in the centre of the chamber by means of wings, *n n*, which fit the sides of the chamber, while the cylindrical valves are somewhat smaller in diameter than their chamber, as shown in fig. 6. This construction of a double puppet-valve allows steam to enter at one or the other of the ports, and pass around the valve-stems, thence between the radial wings *n*, and out through one or both of the openings *p*, through the middle of the screw-rod *i*, as indicated by the arrows in fig. 6. The steam can only pass into one of the ports *k k'* at a time, as the pressure of steam, which is brought to act alternately upon the piston, will close the port in the screw-rod *i*, which is next to the exhaust side of the piston, and permit the steam, which is pressing upon the opposite side of the piston, to escape through the ports in the screw-rod, which are not closed. The end of the screw-rod *s* is formed to receive a wrench, whereby the screw-rod *i* may be removed or replaced at pleasure. The screw-cap *m* is also formed with a square projection for receiving a wrench, which is used in adjusting this cap when it is desired to increase or to diminish the longitudinal play of the valve D, for admitting more or less steam into the chamber C of the piston. In figs. 1, 2, 4, and 5, I have shown this hollow screw-rod *i*, with its valves, ports, and steam passages applied to the piston in such a manner that the steam which enters one or the other of the ports *k k'*, from cylinder A, is conducted into the annular chamber C, and caused to act uniformly upon the expansible packing, which latter forms the outer enclosing ring for this chamber, thus forcing the circumference of the packing against the inside of the cylinder A, and fitting the piston tightly within this cylinder. In the piston represented at figs. 4 and 5, the expansible packing ring B is used in combination with a cylindrical shell, E, whose exterior surface, with that of the expansible ring, closes the space between the heads of the piston. In this case, as in the piston represented at figs. 1 and 2, the entire ring-packing may be removed by removing but one head of the piston; and as in most cases it is desirable that the head at the end of the cylinder furthest from the stuffing-box of the piston-rod should be removed, the piston has a removable head, *c'*, at the corresponding side of the piston. This piston, as the preceding, is fitted with the screw-rod and its appurtenances. The hollow screw-rod thus described, with its double valve and valve-seats, forms what I designate a valve-tube, and this valve-tube may be applied to and removed from the piston without varying the adjustment of the valves and valve-seats, and without taking the piston apart. It may be applied to pistons already constructed by drilling and tapping their heads, thus enabling the pressure of the steam to be used in them for expanding the packing ring. In both the pistons thus described the valve-tube constitutes a valvular apparatus for admitting steam into the piston alternately from its opposite sides, the double valve shifting automatically from one seat to the other, when the steam pressure is transferred from one side to the other of the piston; and in both pistons this valvular apparatus and the ring-packing are combined with the piston in such manner that the ring-packing may be removed and reapplied when one head only of the piston is removed; as, for example, the head designated *c'* in the drawings. In the second piston (that represented by figs. 4 and 5) the ring-packing is composed of two parts, viz, the shell C and the expansible ring B, the two closing the space between the adjacent faces of the piston-heads, and the combination with the piston is such that the whole may be removed, when but one head, *c'*, is taken off.

The second part of my invention is peculiarly important, because it constitutes an expansible steam packing suitable to be applied to pistons already in use without requiring the expansible ring to be of the full breadth of the space between the heads of the piston. It also permits the expansible ring to be freed of the weight of the piston, and left free to adapt itself to the cylinder. I am aware that ball and other valves have been applied to expansible packing steam pistons, wherein one valve-seat is formed in one of the heads of the pistons, and the other seat formed in a screw-cap. But in no instance can the whole device which admits of the entrance and escape of steam, by means of valves, be removed or applied to a common flanged piston without opening the piston or taking the device apart. I therefore do not claim such as my invention; but what I do claim as my invention, is—

The combination of the following instrumentalities, viz, the piston, expansible packing ring, and removable tubular case, with its valves and seats, substantially as set forth.

I also claim the combination of the expansible packing ring for a piston with a cylindrical shell, substantially as set forth.

I also claim the combination of the expansible packing ring, cylindrical shell, piston, and valvular apparatus, substantially as set forth.

In testimony whereof I have hereto set my hand this 17th day of October, 1866.

B. F. HEDDEN.

Witnesses:

J. A. Routh,

A. B. Faulkner.